United States Patent
Mugica et al.

(10) Patent No.: US 8,812,835 B2
(45) Date of Patent: Aug. 19, 2014

(54) PARADIGM FOR HYBRID NETWORK COMMUNICATIONS PROTOCOL MORPHING

(75) Inventors: Antonio Mugica, Boca Raton, FL (US); Paul Babic, Caracus (VE); Oscar Mora, Caracus (VE)

(73) Assignee: Smartmatic International Corporation, Barbados, W. I.

( * ) Notice: Subject to any disclaimer, the term of this patent is extended or adjusted under 35 U.S.C. 154(b) by 1416 days.

(21) Appl. No.: 10/906,344

(22) Filed: Feb. 15, 2005

(65) Prior Publication Data

US 2005/0204021 A1     Sep. 15, 2005

Related U.S. Application Data

(63) Continuation of application No. 09/682,066, filed on Jul. 17, 2001, now abandoned.

(51) Int. Cl.
*H04L 29/06* (2006.01)
*H04L 29/08* (2006.01)

(52) U.S. Cl.
CPC ............... *H04L 29/06* (2013.01); *H04L 69/32* (2013.01); *H04L 69/08* (2013.01)
USPC ........................................................ 713/152

(58) Field of Classification Search
USPC ........................................................ 713/152
See application file for complete search history.

(56) References Cited

U.S. PATENT DOCUMENTS

| 5,386,412 | A | | 1/1995 | Park | |
| 5,400,325 | A | * | 3/1995 | Chatwani et al. | 370/399 |
| 5,699,350 | A | * | 12/1997 | Kraslavsky | 370/254 |
| 6,070,198 | A | * | 5/2000 | Krause et al. | 719/321 |
| 6,195,425 | B1 | * | 2/2001 | Farris | 379/230 |
| 6,226,680 | B1 | | 5/2001 | Boucher | |

* cited by examiner

*Primary Examiner* — Kambiz Zand
*Assistant Examiner* — Stephen Sanders
(74) *Attorney, Agent, or Firm* — Jeffrey M. Furr, Esq.; Furr Law Firm

(57) ABSTRACT

Network interoperability is presently limited due to the existence of many different and often incompatible hardware implementations and communication protocols, where products from competing manufacturers are often not interoperable; and due to the number of protocols already in existence, there is little hope that standards can fully solve the problem in a reasonable time span. Vast potential benefits could be reaped if networks of various types could be accessed and shared regardless of their underlying network protocols and/or physical media, and also increased or unlimited interconnectivity would greatly increase the value of networks. The present invention proposes a novel method to achieve network protocol independence, consisting of a protocol-independent network communications model, that allows communication between device nodes belonging in networks based on diverse physical architectures and protocols, which can therefore be regarded together as hybrid networks.

4 Claims, 3 Drawing Sheets

| PINC Layer | Functionality |
|---|---|
| Application | - This is the actual application, and provides the services that are directly available to system users. e.g., true distributed control network application. |
| Smart Network | - This is the interface between complex network applications and the underlying physical network. It provides network services for applications. |
| Physical | - Underlying physical network. |

Fig 1

| PINC Layer | Functionality |
|---|---|
| Application | - This is the actual application, and provides the services that are directly available to system users. e.g., true distributed control network application. |
| Smart Network | - This is the interface between complex network applications and the underlying physical network. It provides network services for applications. |
| Physical | - Underlying physical network. |

Fig 3

| PINC Layer | PINC Sublayer | Functionality |
|---|---|---|
| Application | Application | - Complex network applications. |
| Smart Network | Encryption | - Data encryption: public- and secret-key algorithms.<br>- Authentication. |
| | Packet Transport | - Packet transport services, connection-oriented and connectionless. |
| | Network Routing | - Computing optimal network paths.<br>- Network load balancing.<br>- Network Quality of Service (QoS) |
| Physical | Physical Transmission | - Division of frames into bit stream and vice versa.<br>- Managing damaged, duplicate and lost frames |
| | Physical Medium | - Bit Timing, voltages.<br>- Physical Network Access |

PARADIGM FOR HYBRID NETWORK COMMUNICATIONS PROTOCOL MORPHING

BACKGROUND RELATED APPLICATIONS

This invention uses the concepts of true distributed control and distributed device control network of our co-pending applications. It also uses the concepts of device controller and network-enabled devices, and the concept of Reliable User Datagram Protocol (RUDP).

BACKGROUND FIELD OF INVENTION

This invention relates to device-to-device network communication methods and systems, specifically to a novel paradigm to achieve communication protocol-independence to enable device-to-device communications across complex hybrid networks.

BACKGROUND DISCUSSION OF PRIOR ART

The Cambridge Dictionary of American English defines a "device" to be an object or machine invented to fulfill a particular purpose. In the present invention, the term "device" is not limited to physical apparati, but is considerably expanded to comprise abstract or virtual devices, such as system operators, that partake in network communications. One fundamental aspect of devices is that they comprise a finite set of states associated with their operation.

According to the present invention, a hybrid distributed device control network comprises a set of interconnected subnetworks of arbitrary topology, each containing several interconnected device controllers and/or network-enabled devices. The term "hybrid" refers to a network that comprises several subnetworks interconnected across dissimilar communication media (e.g., Ethernet, RF, etc), and using different communication protocols (e.g., LONtalk, UDP/IP, etc).

Communication protocols are the "languages" that allow communication equipment (switches, routers, etc.) to intercommunicate. Over the past several years, numerous independent efforts have been made to develop communications protocols to fulfill several existing network communication needs, resulting in different degrees of success. Unfortunately, one consequence of these efforts has been the development of a very large set of different protocols in most cases incompatible with one another. Another consequence has been that such protocols have many times been developed to meet such specific requirements that they are not readily applicable or useful for a wide range of application.

Meanwhile, networks have been created throughout the world, and the existing ones are being expanded; newer ones will be created in the near future at an exponential rate. Thus, it is becoming increasingly important that communication systems be able to utilize and share this complex infrastructure for different purposes to achieve a truly networked future. In the near future, everything will be connected. For this, it is absolutely necessary that all interested parties in the several communications industries agree to use a single communication protocol. Yet, this is an unachievable utopia given the position of most interested parties. Another more realistic option is that a different communication approach be used in which all communication systems that share a network can do so regardless of the underlying network protocol and media. Providing an abstraction layer between applications and underlying physical networks is a first major step towards the future of open interconnectability.

It is one object of this invention to present a novel interconnection model, namely, a Protocol-independent Network Communication (PINC) model which guarantees communications between all interconnected network nodes regardless of the underlying communications protocol, media and/or network technology.

SUMMARY OF INVENTION

The present invention proposes a novel method to achieve network protocol independence in which communication between interconnected network device nodes may be carried out regardless of the underlying network protocol and/or media.

OBJECTS AND ADVANTAGES

Accordingly, several objects and advantages of the present invention are:

a) to provide a novel paradigm for network communications which opens the way to the future of protocol and media-independent device-to-device communication and open interconnectability;

b) to provide a flexible method designed and developed specifically for device-to-device communications, which addresses and overcomes limitations of existing communication methods;

c) to provide a method of device-to-device communication comprising a complex and highly adaptative abstraction layer between network applications and underlying physical network which implements all services required for interdevice communication applications regardless of the underlying network communication protocol and/or media;

d) to provide a method of device-to-device communications which allows all network nodes and routers to operate distributedly and autonomously in agreement with the paradigm of true distributed control;

Other objects and advantages of this invention will become apparent from a consideration of the ensuing description and drawings.

BRIEF DESCRIPTION OF DRAWINGS

In the drawings, closely related figures have the same number but different alphabetic suffixes.

FIG. 1 illustrates the fundamental layer structure of the present network communication model (preferred embodiment).

FIG. 3 shows the most common embodiment of the Smart Network layer, including its fundamental sublayers.

LIST OF REFERENCE NUMERALS IN DRAWINGS

Figure 2:
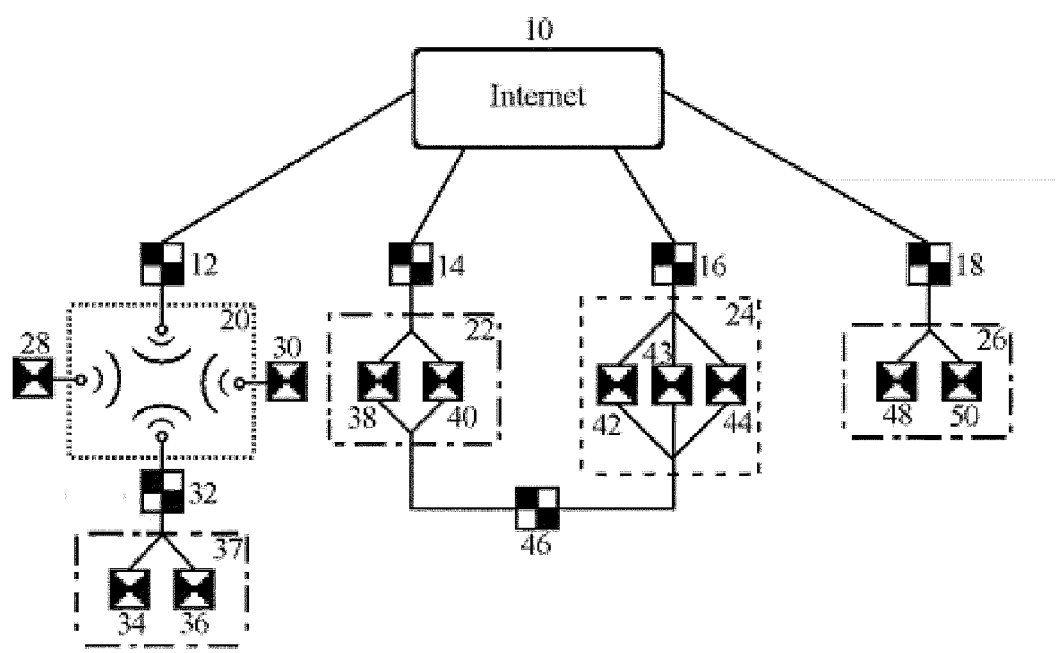
FIG. 2 display an exemplary, hypothetical hybrid network implementing a true distributed control system.

10 Internetwork
12 Network Router Node (Internet to Type III Network)
14, 18 Network Router Node (Internet to Type II Network)
16 Network Router Node (Internet to Type I Network)
20 Type III Subnetwork (Wireless)
22, 26, 37 Type II Subnetwork
24 Type I Subnetwork
28, 30 Type III Network End Node 32 Network Router Node (Type III Network to Type II Network)

34, 36, 38, 40, 48, 50 Type II Network End Nodes 42, 43, 44 Type I Network End Nodes 46 Network Router Node (Type I Network to Type II Network)

DETAILED DESCRIPTION

Now, the present invention will be described by referring to the accompanying drawings that illustrate preferred embodiments of the invention. The present invention proposes a novel interconnection model, namely, a Protocol-independent Network Communications (PINC) model which guarantees communications between all interconnected network nodes regardless of the underlying network protocol, media and/or network technology.

FIG. 1 illustrates the fundamental layer structure of the present model and preferred embodiment. The PINC model consists of three principal layers, namely, the Physical layer, the Smart Network Layer and the Application layer. Next, each of these layers will be described in detail.

The Physical (PH) layer is the lowest-level layer and is usually implemented purely in hardware. This layer deals directly with the physical medium: transmitting raw bits over a communication channel, voltages, bit timing, and several other issues. It is composed of two sublayers, the Physical Medium (PM) sublayer and the Physical Transmission (PTr) sublayer. The PM sublayer serves as interface to the actual transmission medium, be it wired or wireless. The Physical Transmission (PTr) sublayer lies on top of the PM sublayer and interfaces directly with it, using the services implemented by the PM sublayer. The PTr sublayer deals with the transmission of data bit streams over from one end to the other end of a communication channel. The Smart Network (SN) layer comprises the essence of the present invention. It is the SN layer that interconnects and transparently interfaces between the Physical layer, described above, and the Application layer, described below, and that works as a complex abstraction layer which separates the functions and operations of applications from the underlying operation of the physical network.

Thus, by means of the SN layer, all applications may utilize the implemented underlying physical network regardless of the type, topology or protocols.

The SN layer comprises several sublayers, each performing a specific operational function. The fundamental aspect of the SN layer is that it may expand or shrink in functionality and complexity to implement all services required by the high-level network application. Naturally, the SN layer will vary to adapt to the underlying physical network and the services required from it. The sublayers are three: the Network Routing (NR) sublayer, the Packet Transport (PT) sublayer and the Data Encryption (DE) sublayer. The NR sublayer offers services for network routing and network load balancing. The PT sublayer offers services for packet transport, including connection-oriented and/or connectionless transmission. The DE sublayer warrants data security during transmission. The hierarchical ordering of the SN layer's sublayers depends on the specific implementation, and not all sublayers may be present simultaneously, depending on actual implementation requirements.

The Application (AP) layer resides at the highest level of the model and utilizes all services implemented by the underlying layers. Naturally, every network application will have specific communication requirements. It is the SN layer's duty, in combination with the PH layer below, to meet the demands of every application by providing these services.

Operation of Invention

Now, the operation of the present invention, including the operation of every model layer and sublayer, will be described by referring to the accompanying drawings that illustrate preferred embodiments of the invention.

The essential purpose of each layer of the model is to create a level of abstraction in the communication system so that the layers above do not depend on the layers below. That is, each layer acts as an interface between the layer above it and the layer below it, and implements a set of services which the above layer may use to achieve communication. The same concept applies to every sublayer in the model. In the PH layer, the PM sublayer transfers raw data bits into and out of the actual physical medium, in a manner such that a bit "1" sent on one side of the channel is received as a bit "1" at the other end, not as a bit "0" or as noise. All significant communication networks implement this layer. There are many issues associated with this sublayer: how a bit "1" and a bit "0" is represented to minimize bit transmission error or maximize transmission speed or minimize power requirements (e.g., the voltage representing a "1" and a "0"); whether transmission is one-way or two-way; and several others.

In general, all issues involved in the PM sublayer involve electrical, mechanical and other interfaces, and the actual underlying physical medium. This sublayer does not have any knowledge regarding meaning or structure intrinsic to the bits it handles.

The Physical Transmission (PTr) sublayer lies on top of the PM sublayer and interfaces directly with it, using its services. The PTr sublayer's duty is to warrant that a stream of data bits on one end of the communication channel reaches the other end in an error-free fashion. To achieve this, the PTr sublayer may divide the stream of data bits into short frames of data bits of arbitrary sizes (typically, a few hundred bits long) and send them across to the other end of the communication channel. Said data bit frames may be created by inserting a predetermined sequence of bits within the data stream to signal the beginning and end of a frame, which the receiving end may recognize and utilize to recover and segment the received data bit stream into said frames. The PTr sublayer may also receive and process all acknowledge frames sent by the receiver to advise receipt of data frames. It is the PTr sublayer's responsibility to handle cases of damaged, lost and duplicate frames. When a sent frame is corrupted or lost while traveling across the communication channel, the PTr sublayer at the transmitting node may retransmit it, as applicable. Likewise, when duplicate frames are received at the receiving end, the PTr sublayer at the receiving node must discard them.

The operating principle of the SN layer is to allow complex network applications, such as true distributed control, to function over any network. Yet, applications, such as true distributed control, must operate over several types of networks simultaneously, including networks using dissimilar communication media or protocols. Furthermore, such communication protocols may, in many cases, be incompatible. Said complex applications require in many instances the use of several network services, and for a successful implementation, said network services must be supported by the underlying network.

Still, several existing network systems and protocols do not implement a comprehensive set of network services that some complex network applications may require. For instance, some control network protocols do not implement specific network services required by a true distributed control application.

It is the SN layer's responsibility to implement an abstraction layer between network applications and underlying networks so that all services required by the applications are provided. Depending on the specific service requirements of an application, and the specific services implemented by its actual underlying physical network, the structure and operation of the SN layer will vary to adapt. In case the underlying physical network implements several network services required by the network application, the operation of the SN layer may be reduced. On the other hand, as described above, if the underlying physical network does not implement some or all network services required by the application, it is the SN layer's duty to adapt and implement them.

Let there be a complex network application implementing a true distributed control network application, and whose operation requires a hybrid network comprising subnetworks utilizing several dissimilar network communication protocols and media. A true distributed control network application requires several network services for its successful operation, which are described in detail in the aforementioned co-pending patent documents. If said required services, including acknowledged and unacknowledged datagram services; and multicast and broadcast services; among others; are not implemented by the underlying physical network, the SN layer will implement them.

FIG. 2 illustrates an exemplary, hypothetical hybrid network implementing a true distributed control system in which a plurality of network router nodes 12, 14, 16 and 18 are connected to an internet 10. Said routers serve as connection links between internet 10 and subnetworks 20, 22, 24, 26, which use dissimilar communication protocols and/or media. In FIG. 2, subnetwork 20 is of hypothetical Type III (e.g., through a wireless medium), subnetworks 22 and 26 are of hypothetical Type II (e.g., using LONtalk protocol), and subnetwork 24 is of hypothetical Type I (e.g., using RUDP/IP over Ethernet). There are two further components, namely, a subnetwork 37 and a router 46. Subnetwork 37 connects to subnetwork 20 through a router 32. Likewise, router 46 connects subnetworks 22 and 24 together. Each said subnetwork contains a plurality of network end nodes or device nodes. For instance, subnetwork 20 comprises nodes 28 and 30; subnetwork 22 comprises nodes 38 and 40; subnetwork 24 comprises nodes 42, 43 and 44; subnetwork 26 comprises nodes 48 and 50; and subnetwork 37 comprises nodes 34 and 36. For instance, let Network Type I be a Fieldbus network, let Network Type II be an Ethernet network, and let Network Type III be a RF network.

Subnetwork 24 is, then, a Fieldbus subnetwork. Fieldbus networks comprise the equivalent of OSI layers 1 and 2, and do not implement the network services required by a true distributed control application, including acknowledged and unacknowledged datagram, multicast and broadcast network services. Fieldbus does not include any other layers in its network protocol stack; It has been designed primarily for local networks. The SN layer must perform the network routing and support said network services. The SN layer thus speaks directly to the local Fieldbus network, and becomes an interface between the Fieldbus network and the network application. Yet, the SN layer hides all Fieldbus network details from the above application. The application only knows how to send and receive messages from and to virtual devices across a network without knowledge of the underlying Fieldbus network.

Following the example, subnetworks 22 and 37 are Ethernet subnetworks. In contrast to the above Fieldbus example, there are several existing network protocols which handle communication over Ethernet networks. The most frequently used protocol is the Internet Protocol (IP). Hence, to support communication across an Ethernet network, the SN layer first implements the IP protocol. Further, the SN layer also implements said required network services over IP. In case the devices interconnected across an Ethernet network need to communicate with nodes in foreign networks using dissimilar or incompatible network media or protocols, the IP protocol is totally useless. Instead, the network protocol described in our co-pending patent application ("Method of Device-to-Device Communications in Hybrid Distributed Device Control Networks", namely, the HNR or Hybrid Network Routing Protocol) is thoroughly appropriate for this type of universal usage.

Subnetwork 20 is based on a wireless, radio-frequency medium. As is the case with Ethernet networks, there are many network protocols which handle communications over RF networks (e.g., Wireless Ethernet, CDPD, etc). It is the SN layer's duty to implement an appropriate network protocol. Given the highly varying and adaptive nature of the SN layer, which depends on the specific communication requirements of the application and of every interconnected network, it cannot have a fixed or closed-form structure which is directly applicable to all operating instances.

Rather, the SN layer's fundamental feature is that it may expand or shrink in functionality and complexity depending on the support provided by the underlying network (i.e., whether the network supports all required services) and the requirements demanded by the high-level network application.

Yet, the Smart Network layer may be segmented into several sublayers according to functionality. The hierarchic order of the sublayers (i.e., the ordering of the sublayers within the model) may vary depending on the specific network and/or application implementation and requirements.

FIG. 3 shows the most common embodiment of the Smart Network layer. It consists of three fundamental sublayers: the Network Routing sublayer, the Transmission sublayer and the Encryption sublayer.

The main function of the Network Routing (NR) sublayer concerns the delivery of packets from a source node to a destination node across a hybrid network. In the example of FIG. 2, source node 34 may send a packet X to destination node 42. It is the NR sublayer's responsibility to find a network path to deliver packet X to its destination. One way to do this is to transmit packet X to router 32, next to router 12, next across internet 10 to router 16 and finally to its final destination node 42 (alternative paths exist). If all subnetworks on the chosen path use a same network protocol (e.g., Internet Protocol), the NR sublayer implements said network protocol and delivers the packet accordingly. In this case, the NR sublayer must know about the topology of the network and have a method to find suitable paths through it. If, on the other hand, several of said subnetworks utilize dissimilar and incompatible network protocols, a universal approach to network routing must be used, especially HNR. Further, the NR sublayer comprises a set of parameters which determine how a packet may be routed through the network. The NR sublayer, thus, takes this set of parameters, jointly known as Quality of Service (QoS) parameters, to determine the most appropriate network path for a given packet. Typical QoS parameters include throughput (i.e., the byte transfer rate in a given network direction), transit delay (i.e., the total delay from a source node to a destination node) and residual error ratio (i.e., the rate of lost or damaged packets delivered), among others.

Another fundamental function of the NR sublayer is to ensure that some paths (including routers and communication lines) used to deliver packets across the network are not overloaded while other available paths are left underused. Thus, its duty includes performing balancing the loads across the network.

The main function of the Packet Transport (PT) sublayer is to provide communication services to effectively, inexpensively and reliably deliver packets across the network. The PT sublayer thus implements these services and exposes them for use by the above sublayers and the application layer.

The fundamental packet transport services implemented by the PT sublayer are connection-oriented and connectionless services. The connection-oriented service involves the establishment of a node-to-node connection. Next, all appropriate packets are transported from source node to destination node. When all packets have arrived at the destination node, the connection is destroyed.

The connectionless transport service involves the transport of packets from source node to destination node without the use of a point-to-point connection. Packets or datagrams are sent to the destination directly, as needed. There are many types of connectionless packet transport service, specifically acknowledged datagram and unacknowledged datagram. In the acknowledged datagram service, the destination node generates a response packet acknowledging proper receipt of a packet. If the received packet requires a response, the acknowledging can be appended to the response packet as part of the response (i.e., piggybacking technique). In the unacknowledged datagram service, packets are delivered from a source node to a destination node and no acknowledge packet is generated at the destination node. Hence, this service is intrinsically unreliable, though it may be applicable for certain specific applications in which, for example, it is more important in applications in which packets arrive at a specified order and in which the effect of a few damaged or lost packets will be acceptable.

Complex network applications such as a true distributed control application, may only require connectionless services. Other applications may require only connection-oriented services or both.

As it is the case with the NR sublayer, depending on the underlying layers and depending on the requirements of the high-level network application, the PT sublayer may take many forms, as applicable. For instance, if the underlying layers implement an Ethernet network using the IP protocol and the network application only requires the unacknowledged datagram service, the PT sublayer may implement the UDP or RUDP protocol. If, rather, connection-based services are required, the PT sublayer may implement the TCP protocol. If the underlying layers imply communications across hybrid networks, the universal HNR network protocol may be used. Depending on the type of packet transport services required by the network application, the PT sublayer may implement RUDP, UDP, TCP or another applicable protocol on top of HNR.

The top sublayer of the SN layer is the Data Encryption (DE) sublayer. Its fundamental function is to warrant data security during transmission. In many traditional communication models, data encryption is left to be handled by applications at the highest level of the protocol stack. However, due to the significant universal interest in data security, the near future of communications will require all network communication to include data encryption to a certain extent: eventually, all data will be encrypted.

The DE sublayer may implement one or more of several encryption algorithms, including public-key algorithms and secret-key algorithms, as needed. It may also implement one or more authentication protocols.

Conclusion, Ramifications and Scope of Invention

Thus, the reader will see that the present paradigm for protocol-independent network communications provides a flexible method of implementing device-to-device communication across any type of network, regardless of topology, network protocol or network physical medium, which solves limitations of existing methods, since it creates an abstraction layer that handles all interactions between the high-level application layer and the underlying physical network implementation.

Thus, this method provides a novel paradigm for network communications which opens the way to the future of protocol and media-independent device-to-device communication and open interconnectability, While our above description contains many specificities, these should not be construed as limitations to the scope of the invention, but rather as an exemplification of one preferred embodiment thereof. Obviously, modifications and alterations will occur to others upon a reading and understanding of this specification such as, for example, several possible variations to the presented ordering of the sublayers of the SN layer, and several possible variations in the detailed description of the SN layer in which not all layers may be present (e.g., when data encryption is not required, the DE sublayer may be nil).

The description above is intended, however, to include all such modifications and alterations insofar as they come within the scope of the appended claims or the equivalents thereof.

What is claimed is:

1. A comprising: a hybrid device network networking a set of interconnected subnetworks of topology, each containing several interconnected device controllers and network-enabled devices interconnected across dissimilar communication media and using different communication protocols with a Physical Layer, a Smart Network Layer and a Applications Layer; and the method comprising said Smart Network Layer, which may consist of several sublayers in hierarchical order according to functionality requirements of the device types comprising the network, having the following sub-levels in its most common embodiment: a Network Routing Sublayer which handles network routing and load balancing by the delivery of packets from a source node to a destination node across the network, a Packet Transport Sublayer which handles packet transportation between the sublayers and the application layer. , and a Data Encryption Sublayer which handles data security which uses a plurality of encryption algorithms and one or more authentication protocols; where each layer of the model creates a level of abstraction in the network by implementing a set of services made available to the layer above_and where each layer acts as an interface between the layer above it and the layer below it, wherein said Smart Network Layer interfaces with the Physical Layer and with the Application Layer and is able to expand or reduce its functionality and complexity in order to implement the services required by the higher level Applications Layer where if the physical network does not implement network services required by the Application layer, the Smart Network layer will implement said services, and having a Physical Transmission sublayer that lies on top of the Physical Layer where the Physical Transmission sublayer directly with it, using its services to warrant that a stream of data bits on one end of the communication channel reaches the other end in an error-free fashion by dividing the stream of data bits into short frames of data bits of arbitrary sizes and send them across to the other end of the communication channel, the data bit frames are created by inserting a predetermined sequence of bits within the data stream to signal the beginning and end of a frame, which the receiving end recognize and utilize to recover and segment the received data bit stream into said frames.

2. The method in claim 1 further comprising having the Packet Transport sublayer provide both connection-orient and connectionless services where the connection-oriented service involves the establishment of a node-to-node connection and the connectionless transport service involves the transport of packets from source node to destination node without the use of a point-to-point connection.

3. The method in claim 1 further comprising: having each layer of the model create a level of abstraction in the communication system so that the layers above do not depend on the layers below where each layer acts as an interface between the layer above it and the layer below it, and implements a set of services which the above layer may use to achieve communication.

4. The method in claim 1 further comprising where if the physical network does not implement any network services required by an application, the Smart Network layer will implement them.

\* \* \* \* \*